US012680830B2

(12) United States Patent
Zingoni et al.

(10) Patent No.: US 12,680,830 B2
(45) Date of Patent: Jul. 14, 2026

(54) METHOD AND SYSTEM FOR ESTIMATING THE POSITION OF A RAILWAY VEHICLE TRAVELLING ALONG A RAILWAY LINE, AND RAILWAY VEHICLE COMPRISING SUCH SYSTEM

(71) Applicant: ALSTOM Holdings, Saint-Ouen-sur-Seine (FR)

(72) Inventors: Niccolò Zingoni, Bagno a Ripoli (IT); Andrea Lucidi, Florence (IT); Matteo Fratini, Prato (IT); Lorenzo Chiosi, Figline e Incisa Valdarno (IT)

(73) Assignee: ALSTOM HOLDINGS, Saint-Ouen-sur-Seine (FR)

( * ) Notice: Subject to any disclaimer, the term of this patent is extended or adjusted under 35 U.S.C. 154(b) by 10 days.

(21) Appl. No.: 18/763,217

(22) Filed: Jul. 3, 2024

(65) Prior Publication Data

US 2025/0012599 A1    Jan. 9, 2025

(30) Foreign Application Priority Data

Jul. 7, 2023    (EP) ..................................... 23306158

(51) Int. Cl.
  *G01C 21/00*    (2006.01)
  *B61L 25/02*    (2006.01)
(52) U.S. Cl.
  CPC ........ *G01C 21/3844* (2020.08); *B61L 25/025* (2013.01)
(58) Field of Classification Search
  CPC .. B61L 25/025; B61L 2205/04; B61L 25/026; B61L 25/021; B61L 15/0072;
(Continued)

(56) References Cited

U.S. PATENT DOCUMENTS 7,966,126 B2 *   6/2011   Willis .................. B61L 25/025
                                              340/995.25
2003/0216865 A1 *  11/2003   Riewe .................... G01S 19/47
                                              701/470
(Continued)

OTHER PUBLICATIONS

Extended European Search Report issued in EP Application No. 23306158.9, dated Jan. 29, 2024.
(Continued)

*Primary Examiner* — Hunter B Lonsberry
*Assistant Examiner* — Henry R Hinton
(74) *Attorney, Agent, or Firm* — Knobbe, Martens, Olson & Bear, LLP

(57)    ABSTRACT

A method for calculating a location interval of a railway vehicle, including: calculating, at predefined and successive times: maximum and minimum positions reached by the vehicle as points on a digital map based on signals indicative of the absolute position of the vehicle; maximum and minimum distances travelled by the vehicle with respect to a reference point based on odometry; at a selected time adding: to the maximum and minimum positions at a time earlier than the selected time, the difference between values of the maximum distance at the selected and at the earlier times and the difference between values of the minimum distance at the selected and at the earlier times, thereby determining reference first maximum position and second minimum position. The advanced end of the interval is the most forward position between the first reference maximum position and the value of the maximum position at the selected time.

20 Claims, 3 Drawing Sheets

(58) Field of Classification Search
CPC .... B61L 2027/204; B61L 27/20; B61L 23/34; B61L 15/0058; B61L 15/0027; G01S 19/50; G01S 19/14; G01S 19/47; G01S 2205/002; G01S 19/48
See application file for complete search history.

(56) References Cited

U.S. PATENT DOCUMENTS

2007/0203640 A1\*   8/2007   Rousseau .............. B61L 25/025
                                                                701/519
2018/0009454 A1\*   1/2018   Katsuragi ............. B61L 25/026

OTHER PUBLICATIONS

Gsa: "GRAIL: GNSS Introduction in the RAIL sector, GNSS Subsystem Requirement Specification for Enhanced.ETCS Applications", GRAIL, Jun. 26, 2007, in 151 pages.
Neri et al., "GNSS and Odometry Fusion for High Integrity and High Availability Train Control Systems", Proceedings of the 28th International Technical Meeting of the ION Satellite Division, Sep. 14, 2015, pp. 639-648.

\* cited by examiner

METHOD AND SYSTEM FOR ESTIMATING THE POSITION OF A RAILWAY VEHICLE TRAVELLING ALONG A RAILWAY LINE, AND RAILWAY VEHICLE COMPRISING SUCH SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The present disclosure relates to a method and a system for estimating the position of a railway vehicle travelling along a railway line, and to a railway vehicle comprising such a system.

BACKGROUND

More in particular, the present disclosure relates to a method and system for calculating, substantially in real time, a length interval within which is currently located at least a reference part of a railway vehicle travelling along a railway line.

The definition of railway vehicles has to be interpreted hereby in the broadest sense possible and encompasses either single units, such as any locomotive travelling alone, or any convoy/train formed by any number and type of cars.

For ease of description, in the following reference will be made specifically to trains as possible examples of railway vehicles.

As known, in the field of railway transportation, determining in real time the positions of circulating trains in a safe way and in a manner as accurate as possible is of fundamental importance for the safe and efficient management of railway networks.

To this end, one solution commonly adopted foresees the use of balises installed along railways lines in connection with odometry systems installed onboard of trains.

In particular, according to this solution, the position of the train is expressed in terms of a minimum and maximum distance with respect to a reference position, e.g., the beginning of the travel, the last relevant balise group encountered along the railway line or another relevant element of the railway line (e.g. a switch).

When the train passes over a balise group, the uncertainty in the localization is reasonably small; as the distance grows, the uncertainty becomes bigger and bigger.

This is unavoidable with traditional odometry, because it is based on a dead reckoning principle.

In any case, such solution is quite effective; however, in view of the extension or modernization of railway networks, the number of balises required is huge and thus costs related to installation and maintenance are significantly high.

An alternative solution would reside in the possibility of determining the position of a train by exploiting data supplied by Global Navigation Satellite Systems (GNSS).

Such satellite systems can provide a position and a protection level with a certain hazard rate: the protection level is intended as a position interval around the estimated position.

However, the hazard rate provided by the protection level calculated based on GNSS data would be in general higher than the tolerable hazard rate required in the railway domain for a train positioning function that must meet the highest Safety Integrity Level (SIL), namely the SIL4 as defined by the standard CENELEC EN50129.

SUMMARY

The present disclosure provides a method for calculating an interval within which is located at least a reference part of a railway vehicle which is travelling along a railway line, wherein it comprises at least:

(a): calculating, at predefined and successive instants of time, by means on an electronic control unit suitable to be positioned onboard the railway vehicle:

a maximum position and a minimum position reached by the railway vehicle calculated both as points on a digital map and based on first signals which are provided by a receiver suitable to be mounted onboard the railway vehicle and are indicative of the current absolute position of the railway vehicle;

a maximum distance and a minimum distance travelled by the railway vehicle with respect to a reference point, said maximum distance and said minimum distance being calculated based on second signals provided by an onboard odometry system of the railway vehicle;

(b): at a selected instant of time of said predefined and successive instants of time, adding, via said electronic control unit:

to the maximum position calculated at an instant of time earlier than said selected instant of time, the difference between the value of the maximum distance calculated at said selected instant of time and the value of the maximum distance calculated at said earlier instant of time, thereby determining on the digital map a first reference maximum position; and to the minimum position calculated at said earlier instant of time, the difference between the value of the minimum distance calculated at said selected instant of time and the value of the minimum distance calculated at said earlier instant of time, thereby determining on the digital map a second reference minimum position;

(c) calculating said interval within which is located at least said reference part of the railway vehicle by assigning:

as its most advanced end or upper end, the most forward position between the position calculated for the first reference maximum position and the value of the maximum position calculated at said selected instant of time; and as its rearmost end or lower end, the most rearward position between the position calculated for the second reference minimum position and the value of the first minimum position calculated at said selected instant of time.

The present disclosure provides also a system for calculating an interval within which is located at least a reference part of a railway vehicle which is travelling along a railway line, wherein it comprises at least:

an electronic control unit suitable to be positioned onboard the railway vehicle;

at least one digital map associated with or comprised in the electronic control unit;

a receiver which is suitable to be mounted onboard the railway vehicle, said receiver being arranged to provide to the electronic control unit first signals indicative of the current absolute position of the railway vehicle;

an onboard odometry system which is arranged to provide to the electronic control unit second signals indicative of the actual distance travelled by the railway vehicle along the railway line with respect to a reference point;

wherein the electronic control unit is configured to:

calculate at each instant time of a plurality of successive instants of time:

a maximum position and a minimum position both calculated as points on the digital map, said maximum position and said minimum position being calculated based on said first signals provided by said receiver;

a maximum distance and a minimum distance travelled by the railway vehicle with respect to a reference point, said maximum distance and minimum distance being calculated based on said second signals provided by the onboard odometry system of the railway vehicle;

at a selected instant of time of said plurality of successive instants of time, add:

to the maximum position calculated at an instant of time earlier than said selected instant of time, the difference between the value of the maximum distance calculated at said selected instant of time and the value of the maximum distance calculated at said earlier instant of time, thereby determining on the digital map a first reference maximum position; and to the minimum position calculated at said earlier instant of time, the difference between the value of the minimum distance calculated at said selected instant of time and the value of the minimum distance calculated at said earlier instant of time, thereby determining on the digital map a second reference minimum position;

calculate said interval within which is located at least said reference part of the railway vehicle by assigning:

as its most advanced end or upper end, the most forward position between the position calculated for the first reference maximum position and the value of the maximum position calculated at said selected instant of time; and as its rearmost end or lower end, the most rearward position between the position calculated for the second reference minimum position and the value of the first minimum position calculated at said selected instant of time.

The present

The present disclosure further provides a railway vehicle comprising a system for calculating an interval within which is located at least a reference part of a railway vehicle which is travelling along a railway line, wherein it comprises at least:

an electronic control unit suitable to be positioned onboard the railway vehicle;

at least one digital map associated with or comprised in the electronic control unit;

a receiver which is suitable to be mounted onboard the railway vehicle, said receiver being arranged to provide to the electronic control unit first signals indicative of the current absolute position of the railway vehicle;

an onboard odometry system which is arranged to provide to the electronic control unit second signals indicative of the actual distance travelled by the railway vehicle along the railway line with respect to a reference point;

wherein the electronic control unit is configured to:

calculate at each instant time of a plurality of successive instants of time:

a maximum position and a minimum position both calculated as points on the digital map, said maximum position and said minimum position being calculated based on said first signals provided by said receiver;

a maximum distance and a minimum distance travelled by the railway vehicle with respect to a reference point, said maximum distance and minimum distance being calculated based on said second signals provided by the onboard odometry system of the railway vehicle;

at a selected instant of time of said plurality of successive instants of time, add:

to the maximum position calculated at an instant of time earlier than said selected instant of time, the difference between the value of the maximum distance calculated at said selected instant of time and the value of the maximum distance calculated at said earlier instant of time, thereby determining on the digital map a first reference maximum position; and to the minimum position calculated at said earlier instant of time, the difference between the value of the minimum distance calculated at said selected instant of time and the value of the minimum distance calculated at said earlier instant of time, thereby determining on the digital map a second reference minimum position;

calculate said interval within which is located at least said reference part of the railway vehicle by assigning:

as its most advanced end or upper end, the most forward position between the position calculated for the first reference maximum position and the value of the maximum position calculated at said selected instant of time; and as its rearmost end or lower end, the most rearward position between the position calculated for the second reference minimum position and the value of the first minimum position calculated at said selected instant of time.

BRIEF DESCRIPTION OF THE DRAWINGS

Further characteristics and advantages will become apparent from the description of some preferred but not exclusive exemplary embodiments of a method and system machine according to the present disclosure, illustrated only by way of non-limitative examples with the accompanying drawings, wherein.

It should be noted that in order to clearly and concisely describe the present disclosure, the drawings may not necessarily be to scale and certain features of the disclosure may be shown in somewhat schematic form.

DETAILED DESCRIPTION

Further, when the term "adapted" or "arranged" or "configured" or "shaped", is used herein while referring to any component as a whole, or to any part of a component, or to a combination of components, it has to be understood that it means and encompasses correspondingly either the structure, and/or configuration and/or form and/or positioning of the related component or part thereof, or combinations, such term refers to.

In particular, for electronic and/or software means, each of the above listed terms means and encompasses electronic circuits or parts thereof, as well as stored, embedded or running software codes and/or routines, algorithms, or complete programs, suitably designed for achieving the technical result and/or the functional performances for which such means are devised.

In addition, when the term "about" or "substantial" or "substantially" is used herein, it has to be understood as encompassing an actual variation of plus or minus 5% with respect to an indicated reference value, axis, time or position.

Figure 1:
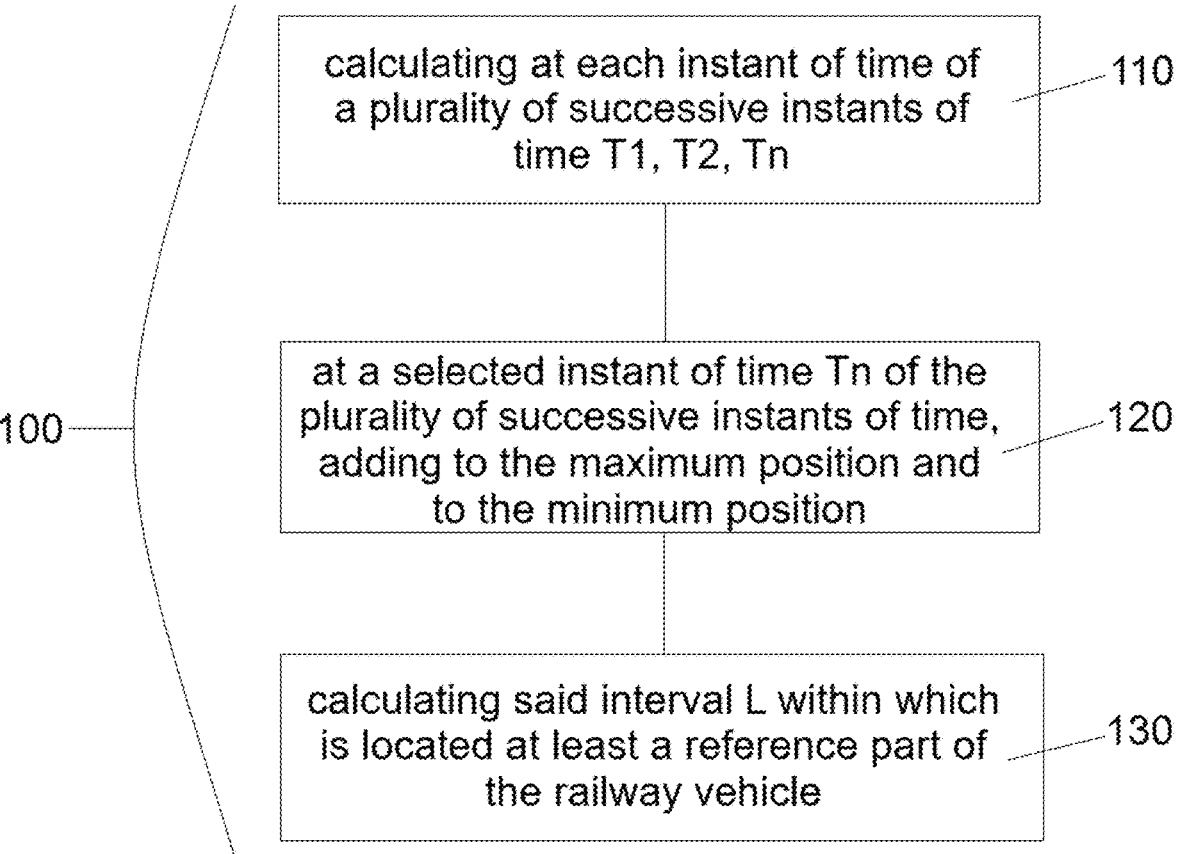
FIG. 1 is a flow diagram schematically illustrating a method according to the disclosure for calculating an interval within which is positioned at least a reference part of a railway vehicle travelling along a railway line.
Figure 2:
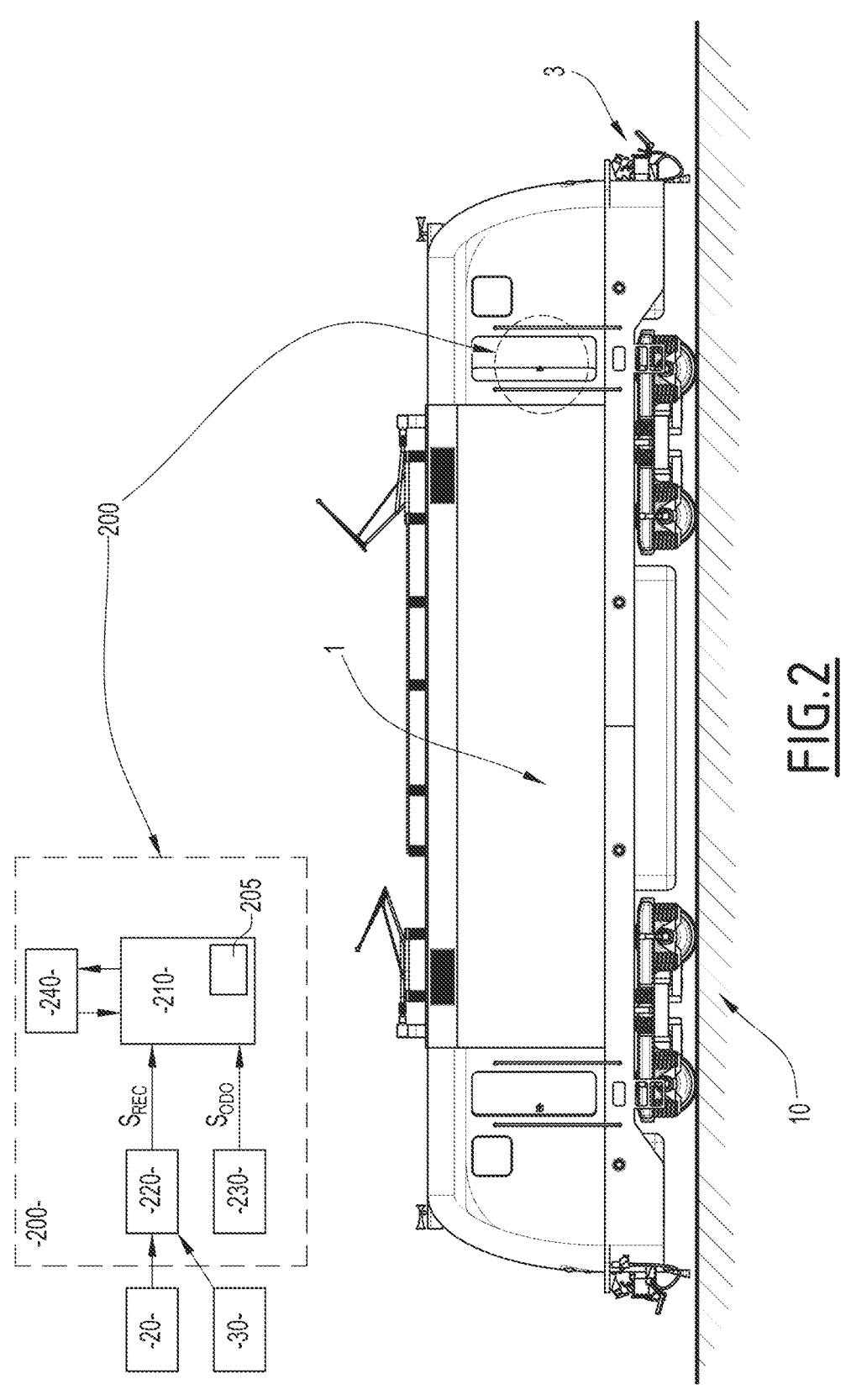
FIG. 2 is a block diagram schematically illustrating a system according to the disclosure for calculating an interval within which is positioned at least a reference part of a railway vehicle travelling along a railway line.

FIGS. 1 and 2 illustrate a method and a system for calculating, substantially in real time, a length interval within which is located at least a reference part of a railway vehicle which is travelling along a railway line.

As illustrated in FIG. 2, the system 200 is schematically illustrated as installed onboard of a railway vehicle represented by a locomotive 1 which is running along a railway line 10, and the reference part thereof can be represented for example as the front-end part 3 (which can be for instance the front surface of one or both the front buffers).

The system 200 comprises at least:

an electronic control unit 210 suitable to be mounted onboard the railway vehicle 1;

at least one digital map 205;

a receiver 220 which is suitable to be mounted onboard the railway vehicle 1 and provides the electronic control unit 210 with first signals $S_{REC}$ suitable for the computation of the current absolute position of the railway vehicle 1 along the railway line 10 and indicative of the current absolute position of the railway vehicle 1 along the railway line 10;

an onboard odometry system 230 which is arranged to provide the electronic control unit 210 with second signals $S_{ODO}$ indicative of the actual distance travelled by the railway vehicle 1 along the railway line 10 with respect to a reference point.

The at least one digital map 205, which is a digital representative of the railway line 10 along which the railway vehicle to be located is travelling, can be external and associated to the electronic control unit 210, or can be comprised therein, e.g. stored in a memory unit of the electronic control unit 210 itself, such as a data storage unit 240 as schematically illustrated in the example of FIG. 2.

The electronic control unit 210 can be constituted by, or comprise, any suitable processor-based device, e.g. a processor of a type commercially available, suitably programmed and provided to the extent necessary with circuitry, in order to perform the innovative functionalities devised for it according to the present disclosure.

In particular, the receiver 220 is suitable to receive from a system external to the railway vehicle 1, signals suitable for the computation of the current absolute position of the railway vehicle along the railway line and, responsive to said signals received from the external system, to provide the electronic control unit 210 said first signals $S_{REC}$.

In one possible embodiment, the receiver 220 is configured to receive signals from an external global navigation satellite system (GNSS), schematically represented in FIG. 2 by the reference number 20, so as to receive signals suitable for the computation of the current absolute position of the railway 1 vehicle along the railway line 10.

These signals are then properly handled by the receiver 220 itself to provide the electronic control unit 210 with said first signals $S_{REC}$.

Alternatively or in addition, the receiver 220 is configured to receive signals from an external communications network, in particular a 5G communications network, schematically represented in FIG. 2 by the reference number 30, so as to receive signals suitable for the computation of the current absolute position of the railway vehicle 1 along the railway line 10, which are then properly handled by the receiver 220 itself to provide to the electronic control unit 210 said first signals $S_{REC}$.

In turn, the odometry system 230 can be of a type known per se, e.g. one already installed onboard on trains, provided that its safety level is equal or better than the one requested for the overall solution (e.g. it meets the highest Safety Integrity Level (SIL), namely the SIL4 as defined by the standard CENELEC EN50129), and comprises one or more sensors, such as odometer(s), according to solutions well known or readily available to those skilled in the art and thus not described herein in details.

Usefully, in the system 200 according to the disclosure, the electronic control unit 210 is configured to calculate at each instant of time of a plurality of successive instants of time T1, T2 . . . Tn (being Tn the current time and T1, T2 . . . time instants in the past):

a maximum position $P_{SATMAX}$ and a minimum position $P_{SATMIN}$ both calculated as points on the digital map 205, said maximum position $P_{SATMAX}$ and minimum position $P_{SATMIN}$ being calculated based on said first signals $S_{REC}$ indicative of the current absolute position of the railway vehicle 1, which are provided by the receiver 220;

and, independently from the calculation of the maximum and minimum positions;

a maximum distance $D_{ODOMAX}$ and a minimum distance $D_{ODOMIN}$ travelled by the railway vehicle 1 with respect to a reference point, e.g. the starting point of the mission of the vehicle, said maximum distance $D_{ODOMAX}$ and second minimum distance $D_{ODOMIN}$ being calculated based on said second signals $S_{ODO}$ provided by the odometry system 230 onboard of the railway vehicle 1.

In practice, according to the disclosure, the electronic control unit 210 calculates on the digital map 205 at various and subsequent instants of time T1, T2, T3, Tn, the values of the maximum position $P_{SATMAX}$ and the minimum position $P_{SATMIN}$ and independently, and with respect to the reference point, e.g. the starting point of the mission of the railway vehicle 1, also the values of the maximum distance $D_{ODOMAX}$ and the minimum distance $D_{ODOMIN}$.

All these values calculated at each relevant instant of time are for example stored in a data storage unit, such as the data storage unit 240 schematically represented in FIG. 2, e.g. a memory or equivalent data storing unit which is part of or is associated with the electronic control unit 210.

The stored data can be retrieved and used by the electronic control unit 210.

Figure 3:
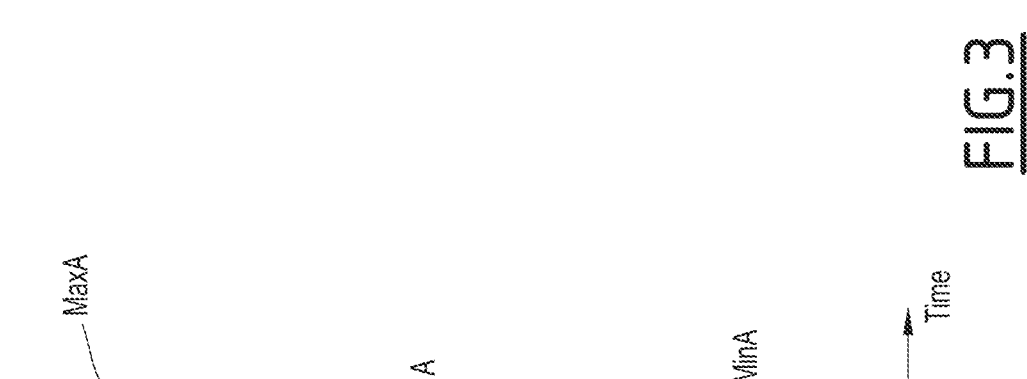
FIG. 3 is a graph schematically representing calculated length intervals via the system and method according to the disclosure.

The electronic control unit 210 is further configured to compute, at a selected instant of time Tn of the predefined and successive instants of time T1, T2, Tn:

a new position on the digital map 205, by starting from the maximum position $P_{T1SATMAX}$ calculated at an instant of time T1 (of the above mentioned plurality of instants of time) earlier than said selected instant of time Tn, and by adding (by the use of the map 205) to this maximum position the difference between the value of the maximum distance $D_{TnODOMAX}$ calculated at the selected instant of time Tn and the value of the maximum distance $D_{T1ODOMAX}$ calculated at said earlier instant of time T1, thereby determining a first reference maximum position on the map 205, that can be expressed in terms of absolute coordinates or in terms of distance from a reference position, indicated on the segment A in FIG. 3 by the reference MaxA.

In practice, in this step, the electronic control unit 210 calculates the value of the first reference maximum position MaxA by using the following formula:

$$\text{Position (Max}A) = \text{Position\_P}_{T1SATMax} + \text{Value}(D_{odo2Max} - D_{odo1Max})$$

Further, the electronic control unit 210 is further configured to compute, at said selected instant of time Tn of the predefined and successive instants of time T1, T2, Tn:

a further new position in the digital map 205, by starting from the minimum position $P_{T1SATMIN}$ calculated at said earlier instant of time T1, and by adding to this minimum position the difference between the value of the minimum distance $D_{TnODOMIN}$ calculated at said selected instant of time Tn and the value of the minimum distance $D_{T1ODOMAX}$ calculated at said earlier instant of time T1, thereby determining a second reference minimum position in the map 205, that can be expressed in terms of absolute coordinates or in terms of distance from a reference position, indicated on the segment A in FIG. 3 by the reference MinA.

In practice, in this step, the electronic control unit 210 calculates the value of the second reference minimum position MinA by using the following formula:

$$\text{Position (Min}A) = \text{Position\_P}_{T1SATMin} + \text{Value}(D_{odo2Min} - D_{odo1Min})$$

Once such positions MaxA and MinA are calculated, the electronic control unit 210 is further configured to calculate the interval within which is located at least a reference part 3 of the railway vehicle 1 by assigning:

as its most advanced end or upper end, the most forward position between the one calculated for the first reference maximum position MaxA and the value of the maximum position $P_{TnSATMAX}$ calculated at said selected instant of time Tn, which value is indicated in the segment B of FIG. 3 by the reference MaxB; and as its rearmost end or lower end, the most rearward position between the one calculated for the second reference minimum position MinA and the value of the first minimum position $P_{TnSATMIN}$ calculated at said selected instant of time Tn, which value is indicated in the segment B of FIG. 3 by the reference MinB.

In practice, according to the disclosure, the interval within which at least a reference part 3 of the railway vehicle 1 is located at the selected instant of time Tn, indicated in FIG. 3 by the segment L, has a value spanning, along the railway line 10, from the determined rearmost end to the determined most advanced end, and represents a range within which at least a reference part 3 of the railway vehicle 1 is currently located.

In one possible embodiment, the electronic control unit 210 is further configured to select the earlier instant of time T1 with respect to the said selected instant of time Tn (e.g., current time) based on when at least one of the following criteria is satisfied:

at least a predefined interval has elapsed between said selected instant of time Tn and said earlier instant time T1;

the railway vehicle has travelled at least a predefined distance along the railway line with reference to its position at said earlier instant of time T1.

In one possible embodiment, the computation of the maximum and minimum positions $P_{T1SATMax}$ and $P_{T1SATMin}$ to be used as absolute positions in the past are implemented with a certain algorithm, while the computation of the maximum and minimum positions $P_{TnSATMax}$ and $P_{TnSATMin}$ to be used as current absolute positions are implemented with a different algorithm (both algorithms using the signals $S_{REC}$).

As above indicated, FIG. 1 schematically illustrates a method 100 for calculating, substantially in real time, an interval L on the digital map 205 within which is located at least a reference part, e.g. the front-end part 3, of a railway vehicle travelling along a railway line 10.

The method 100, which can be carried out for example by using the components of the system 200 previously described, comprises at least the following steps:

110: calculating at each instant of time of a plurality of successive instants of time T1, T2, Tn, by means on the electronic control unit 210 suitable to be positioned onboard the railway vehicle:

a maximum position $P_{SATMAX}$ and a minimum position $P_{SATMIN}$ both calculated as points on the digital map 205, said maximum position $P_{SATMAX}$ and minimum position $P_{SATMIN}$ being calculated based on first signals $S_{REC}$ which are provided by a receiver 220 suitable to be mounted onboard the railway vehicle 1, and are indicative of the current absolute position of the railway vehicle 1;

a maximum distance $D_{ODOMAX}$ and a minimum distance $D_{ODOMIN}$ travelled by the railway vehicle 1 with respect to a reference point, e.g. the starting point of the mission of the railway vehicle 1, said maximum distance $D_{ODOMAX}$ and minimum distance $D_{ODOMIN}$ being calculated based on second signals $S_{ODO}$ provided by an onboard odometry system 230 of the railway vehicle 1;

120: at a selected instant of time Tn of the plurality of successive instants of time, adding, via said electronic control unit 210:

to the maximum position $P_{T1SATMAX}$ calculated at an instant of time T1 earlier than said selected instant of time Tn, the difference between the value of the maximum distance $D_{TnODOMAX}$ calculated at the selected instant of time Tn and the value of the maximum distance $D_{T1ODOMAX}$ calculated at said earlier instant of time T1, thereby determining on the digital map 205, a first reference maximum position indicated on the segment A in FIG. 3 by the reference MaxA; and to the minimum position $P_{T1SATMIN}$ calculated at said earlier instant of time T1, the difference between the value of the minimum distance $D_{TnODOMIN}$ calculated at said selected instant of time Tn and the value of the minimum distance $D_{T1ODOMAX}$ calculated at said earlier instant of time T1, thereby determining a second reference minimum position in the map 205, indicated on the segment A in FIG. 3 by the reference MinA;

130: calculating said interval L within which is located at least a reference part 3 of the railway vehicle 1 by assigning:

as its most advanced end or upper end, the most forward position between the one calculated for the first reference maximum position MaxA and the value of the maximum position $P_{TnSATMAX}$ calculated at said selected instant of time Tn, which value is indicated in the segment B of FIG. 3 by the reference MaxB; and as its rearmost end or lower end, the most rearward position between the one calculated for the second reference minimum position MinA and the value of the first minimum position $P_{TnSATMIN}$ calculated at said selected instant of time Tn, which value is indicated in the segment B of FIG. 3 by the reference MinB.

In one possible embodiment, the earlier instant of time T1 is selected with respect to the selected instant of time Tn (e.g. current time) based on when at least one of the following criteria is satisfied:

at least a predefined time interval has elapsed between said selected instant of time Tn and said earlier instant time T1;

the railway vehicle has travelled at least a predefined distance along the railway line 10 with reference to its position at said earlier instant of time.

The selection of the instant of time Tn, and hence of the calculated values at that instant of time, is executed, while the railway vehicle 1 is travelling, by the electronic control unit 210.

According to a possible embodiment, said interval of time is comprised between 1 and 30 seconds, preferably between 3 and 20 seconds, and more preferably said interval of time is about 10 seconds.

In one possible embodiment, the predefined distance is comprised between 10 m and 150 m, and preferably said predefined distance is about 100 m.

Alternatively, the selected instant of time Tn can be prefixed.

In one possible embodiment, said reference position is the starting point of the travel of the railway vehicle 1, or the last group of balises among those laid down along the railway line 10, last passed over by the railway vehicle 1, or another relevant element of the railway line 10 taken as a reference point, e.g., a switch.

In FIG. 3, the illustrated segments A, B, L, and related endpoints are counted with reference of the Last Group of Reference Balises (LGRB) plotted on the ordinate axis Y versus the time (plotted along the abscissa axis X).

In practice, according to the method 100 and system 200 of the present disclosure, the calculation of the interval L inside which there is located the train, is realized by combining the data received from an external system with the data obtained via a traditional on board odometry system.

Usefully, in the present disclosure, the odometric data and for example the GNSS position data are not combined to obtain more precise position data, for example by statistical computations, but the odometric data are used to project for example a GNSS position data (or any equivalent data provided by an external system) taken at an earlier instant of time (the instant T1 in the exemplary embodiments previously described) to a second later instant (the instant of time Tn in the exemplary embodiment previously illustrated) at which a further GNSS position data is determined.

This allows the improvement of the Hazard Rate of the position interval around the estimated vehicle's position (protection level) within which the probability that the real train position is located has a value which satisfies a Tolerable Hazard Rate, and can meet the required railway safety standard (e.g., SIL4 level).

In other words, the safety principle applied by the method 100 and system 200 according to the disclosure is based on the increase of for example a GNSS-based solution integrity through the combination of two solutions. In more details, let's assume in more general terms that GNSS $(t-T_L)$ and GNSS (t) are two Protection Levels (PL) determined by two GNSS samples at the instant of times $t-T_L$ and t. $T_L$ can be defined as the Time Lag and is a function of the time elapsed and/or the distance travelled by a train between the two instants of time.

Generally, the calculations at such two times and related data and are not statistically independent since they are correlated by several errors affecting in the same way both data. Examples of such influencing errors are those caused by the ionospheric and tropospheric delays that have slow variations during the day, mainly depending on satellite elevation.

Given:

$F_{t-T_L}$: event "PL not including the real train position at $t-T_L$"

$F_t$: event "PL not including the real train position at t"

$P(F_{t-T_L})$: Unconditional probability of the event $F_{t-T_L}$.

$P(F_t|F_{t-T_L})$: Conditional probability of the event $F_t$, conditioned to the event $F_{t-T_L}$ If GNSS $(t-T_L)$ is propagated to instant t thanks to the odometry system, it is possible to conveniently combine it with GNSS(t).

The two protection levels are combined through the union of them and the result of this union is a new protection level. This new protection level guarantees to include the real train position even if only one protection level at instant $(t-T_L)$ or t includes it.

In other words, this new protection level would fail only if both protection levels fail (event $F_{t-T_L} \cap F_t$).

The probability of the new protection level not including the real position of the railway vehicle 1 is thus given by the probability of GNSS$(t-T_L)$ not including the real train position (event named $F_{t-T_L}$) AND GNSS(t) not including the real train position (event named $F_t$), conditioned by $F_{t-T_L}$:

$$P\!\left(F_{t-T_L} \cap F_t\right) = P\!\left(F_{t-T_L}\right) \times P\!\left(F_t|F_{t-T_L}\right)$$

Hence, it is evident from the foregoing description that the method 100 and system 200, by combining the measurements based on external systems, such as GNNS, with those of traditional onboard odometry (with a safety level equal or better than the one requested for the overall solution), allow estimating the position of a railway vehicle travelling along a railway line in a safer manner, meeting at the same time the requested safety standards, e.g., the SIL4 level as defined by the standard CENELEC EN50129.

This allows reducing the number of balises used since their use can be limited to areas not covered by systems allowing to calculate the absolute position of a railway vehicle, such as Global Navigation Satellite Systems or 5G network systems, et cetera.

These results are achieved according to a solution very simple which exploits in an innovative way components already installed on board of trains, such as the odometers, and can be easily used onboard of new railway vehicles such as on already operating ones.

The method 100 and system 200 thus conceived are susceptible of modifications and variations, all of which are within the scope of the inventive concept as defined in particular by the appended claims; for example, there could be more than one electronic control units for sharing in coordination the various tasks and functionalities before-hand described, it is possible to determine the position of a reference part of the railway vehicle other than the part 3, e.g. the front buffer(s) illustrated in the exemplary embodiment described, or even to determine the position of the entire railway vehicle 1.

As an example, a computer system may be implemented in the various embodiments in the described subject matter. The computer system can include a processor, main memory, storage, a bus, and input. The processor may be one or more processors. The processor executes instructions that are communicated to the processor through the main memory. The main memory feeds instructions to the processor. The main memory is also connected to the bus. The main memory may communicate with the other components of the computer system through the bus. Instructions for the computer system are transmitted to the main memory through the bus. Those instructions may be executed by the processor. Executed instructions may be passed back to the main memory to be disseminated to other components of the computer system. The storage may hold large amounts of data and retain that data while the computer system is unpowered. The storage is connected to the bus and can communicate data that the storage holds to the main memory through the bus.

All the details may furthermore be replaced with technically equivalent elements.

What is claimed is:

1. A method for calculating, substantially in real time, an interval within which at least a reference part of a railway vehicle which is travelling along a railway line is located, the railway vehicle comprising a controller positioned in the railway vehicle, the method, via the controller, comprising:

calculating, at predefined and successive instants of time:
a maximum position and a minimum position reached by the railway vehicle both calculated as points on a digital map and based on first signals which are provided by a receiver mounted onboard the railway vehicle and are indicative of a current absolute position of the railway vehicle; and
a maximum distance and a minimum distance travelled by the railway vehicle with respect to a reference position, the maximum distance and the minimum distance being calculated based on second signals provided by an onboard odometry system of the railway vehicle;

at a selected instant of time of the predefined and successive instants of time, adding:
to the maximum position calculated at an instant of time earlier than the selected instant of time, a difference between a value of the maximum distance calculated at the selected instant of time and a value of the maximum distance calculated at the instant of time earlier than the selected instant of time, thereby determining on the digital map a first reference maximum position; and
to the minimum position calculated at the instant of time earlier than the selected instant of time, a difference between a value of the minimum distance calculated at the selected instant of time and a value of the minimum distance calculated at the instant of time earlier than the selected instant of time, thereby determining on the digital map a second reference minimum position; and calculating the interval within which at least the reference part of the railway vehicle is located, by assigning:
as its most advanced end or upper end, a most forward position between a position calculated for the first reference maximum position and a value of the maximum position calculated at the selected instant of time; and
as its rearmost end or lower end, a most rearward position between a position calculated for the second reference minimum position and a value of the minimum position calculated at the selected instant of time.

2. The method of claim 1, wherein the selected instant of time is selected with respect to the instant of time earlier than the selected instant of time based on when at least one of the following criteria is satisfied:
at least a predefined time interval has elapsed between the selected instant of time and the instant of time earlier than the selected instant of time; or
the railway vehicle has travelled at least a predefined distance along the railway line with reference to its position at the instant of time earlier than the selected instant of time.

3. The method of claim 2, wherein the predefined time interval is comprised between 1 and 30 seconds.

4. The method of claim 3, wherein the predefined time interval is about 10 seconds.

5. The method of claim 2, wherein the predefined distance is comprised between 10m and 150m.

6. The method of claim 5, wherein the predefined distance is about 100m.

7. The method of claim 1, wherein the reference position is a starting point of a travel of the railway vehicle or a last group of balises laid down along the railway line or another element of the railway line taken as a reference.

8. A system for calculating, substantially in real time, an interval within which at least a reference part of a railway vehicle which is travelling along a railway line is located, comprising:
a controller positioned onboard the railway vehicle;
at least one digital map associated with or comprised in the controller;
a receiver mounted onboard the railway vehicle, the receiver being arranged to provide to the controller first signals indicative of a current absolute position of the railway vehicle; and
an onboard odometry system which is arranged to provide to the controller second signals indicative of an actual distance travelled by the railway vehicle along the railway line with respect to a reference point;
wherein the controller:
calculates at each instant time of a plurality of successive instants of time:
a maximum position and a minimum position both calculated as points on the digital map, the maximum position and the minimum position being calculated based on the first signals provided by the receiver; and
a maximum distance and a minimum distance travelled by the railway vehicle with respect to the reference point, the maximum distance and minimum distance being calculated based on the second signals provided by the onboard odometry system of the railway vehicle;

at a selected instant of time of the plurality of successive instants of time, adds:

to the maximum position calculated at an instant of time earlier than the selected instant of time, a difference between a value of the maximum distance calculated at the selected instant of time and a value of the maximum distance calculated at the instant of time earlier than the selected instant of time, thereby determining on the digital map a first reference maximum position; and to the minimum position calculated at the instant of time earlier than the selected instant of time, a difference between a value of the minimum distance calculated at the selected instant of time and a value of the minimum distance calculated at the instant of time earlier than the selected instant of time, thereby determining on the digital map a second reference minimum position; and calculates the interval within which at least the reference part of the railway vehicle is located, by assigning:

as its most advanced end or upper end, a most forward position between the position calculated for the first reference maximum position and a value of the maximum position calculated at the selected instant of time; and as its rearmost end or lower end, a most rearward position between the position calculated for the second reference minimum position and a value of the minimum position calculated at the selected instant of time.

9. The system of claim 8, wherein the controller is further configured to select the selected instant of time with respect to the instant of time earlier than the selected instant of time based on when at least one of the following criteria is satisfied:

at least a predefined time interval has elapsed between the selected instant of time and the instant of time earlier than the selected instant of time; or the railway vehicle has travelled at least a predefined distance along the railway line with reference to its position at the instant of time earlier than the selected instant of time.

10. The system of claim 8, wherein the receiver is configured to receive from a satellite system or from a 5G communications network signals indicative of the current absolute position of the railway vehicle.

11. A railway vehicle comprising the system of claim 8.

12. The method of claim 1, wherein the calculation of the interval is performed according to a railway safety standard protocol to control the railway vehicle.

13. The method of claim 12, wherein the railway safety standard protocol meets safety integrity level defined for railway signaling and control system by CENELEC EN 50129.

14. The method of claim 12, wherein the railway safety standard protocol meets a safety Integrity Level 4 (SIL4).

15. The method of claim 12, wherein the railway safety standard protocol has a probability of a single error in 10,000 years.

16. The system of claim 9, wherein the predefined time interval is comprised between 1 and 10 seconds.

17. The system of claim 16, wherein the predefined time interval is comprised between 1 and 3 seconds.

18. The system of claim 8, wherein the calculation of the interval is performed according to a railway safety standard protocol to control the railway vehicle.

19. The system of claim 18, wherein the railway safety standard protocol meets safety integrity level defined for railway signaling and control system by CENELEC EN 50129.

20. The system of claim 18, wherein the railway safety standard protocol meets a safety Integrity Level 4 (SIL4).

* * * * *